United States Patent
Cifers, III

(10) Patent No.: US 10,967,939 B1
(45) Date of Patent: *Apr. 6, 2021

(54) ACCESSORY MOUNTING TRACK

(71) Applicant: Luther Cifers, III, Ameilia, VA (US)

(72) Inventor: Luther Cifers, III, Ameilia, VA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/825,083

(22) Filed: Nov. 28, 2017

Related U.S. Application Data

(63) Continuation of application No. 14/822,574, filed on Aug. 10, 2015, now Pat. No. 9,828,073, which is a continuation-in-part of application No. 13/954,253, filed on Jul. 30, 2013, now Pat. No. 9,671,060.

(60) Provisional application No. 61/677,455, filed on Jul. 30, 2012, provisional application No. 61/680,254, filed on Aug. 6, 2012.

(51) Int. Cl.
| | |
|---|---|
| *B63B 34/20* | (2020.01) |
| *B63B 17/00* | (2006.01) |
| *F16B 2/06* | (2006.01) |
| *F16M 13/02* | (2006.01) |
| *B63B 34/26* | (2020.01) |

(52) U.S. Cl.
CPC ............. *B63B 34/20* (2020.02); *B63B 17/00* (2013.01); *F16B 2/065* (2013.01); *F16M 13/02* (2013.01); *B63B 34/26* (2020.02)

(58) Field of Classification Search
CPC ... B63B 17/00; B63B 35/71; B63B 2035/715; B63B 34/20; B63B 34/26; F16B 2/06; F16B 2/065; F16M 13/02; F16M 13/022
See application file for complete search history.

(56) References Cited

U.S. PATENT DOCUMENTS

| | | | |
|---|---|---|---|
| 585,475 A | 6/1897 | Huber | |
| 1,705,086 A | 3/1929 | Ferguson | |
| 2,157,309 A | 5/1939 | Swedman et al. | |
| 2,176,644 A | 10/1939 | Sladek | |
| 2,269,847 A | 1/1942 | Feinson | |
| 2,859,710 A | 11/1958 | Elsner | |
| 2,928,512 A * | 3/1960 | Slater | F16B 37/045 403/22 |

(Continued)

FOREIGN PATENT DOCUMENTS

| | | |
|---|---|---|
| FR | 2604842 A1 | 5/1988 |
| JP | 10060755 A | 3/1998 |

(Continued)

OTHER PUBLICATIONS

YouTube video titled "Kayak Mount—RAM Mounts 1" Ball Track Adapter, www.youtube.com/watch?v=oOMBAQq-SWk (Published on Feb. 28, 2013).*

(Continued)

*Primary Examiner* — Ajay Vasudeva
(74) *Attorney, Agent, or Firm* — Thedford I. Hitaffer; Hitaffer & Hitaffer, PLLC

(57) ABSTRACT

An accessory mounting track provides quick and easy removable attachment and positioning of various devices. The method of attachment of devices to the accessory mounting track may be compatible with the attachment of these devices to other mounting systems, allowing the accessory mounting track to be used interchangeably with those systems.

16 Claims, 6 Drawing Sheets

(56) References Cited

U.S. PATENT DOCUMENTS

| | | | | |
|---|---|---|---|---|
| 3,129,751 | A | * | 4/1964 | Weber .................... A47H 1/06 160/345 |
| 3,208,560 | A | | 9/1965 | Cote |
| 3,291,088 | A | | 12/1966 | Klose |
| 3,331,348 | A | | 7/1967 | Dyer |
| 3,381,925 | A | | 5/1968 | Higuchi |
| 4,126,228 | A | | 11/1978 | Bala et al. |
| 4,183,387 | A | | 1/1980 | Lenz |
| 4,226,394 | A | * | 10/1980 | Einhorn .................. A47J 47/16 24/716 |
| 4,244,501 | A | | 1/1981 | Ingram |
| 4,273,487 | A | | 6/1981 | Mclennan |
| 4,315,393 | A | * | 2/1982 | Schack ................ F16B 37/046 52/710 |
| 4,616,771 | A | | 10/1986 | Heideman |
| 4,699,484 | A | | 10/1987 | Howell et al. |
| 4,835,852 | A | | 6/1989 | Asplund et al. |
| 4,969,784 | A | | 11/1990 | Yanke |
| 5,026,013 | A | | 6/1991 | Robbins |
| 5,222,851 | A | | 6/1993 | Dickerson |
| 5,244,186 | A | | 9/1993 | Chandler |
| 5,305,700 | A | * | 4/1994 | Strong .................... B63H 9/10 114/112 |
| 5,421,036 | A | | 6/1995 | Stevens et al. |
| 5,487,518 | A | | 1/1996 | Mccraney et al. |
| 5,598,959 | A | | 2/1997 | Lorensen et al. |
| 5,676,088 | A | * | 10/1997 | Blaisdell ................ B63B 3/20 114/343 |
| 5,864,997 | A | | 2/1999 | Kelly |
| 6,019,543 | A | | 2/2000 | Junker |
| 6,021,984 | A | | 2/2000 | Mills |
| 6,086,300 | A | | 7/2000 | Froehlich |
| 6,238,153 | B1 | | 5/2001 | Karrer |
| 6,290,426 | B1 | * | 9/2001 | van Gijsel ............ F16B 37/045 403/374.3 |
| 6,398,149 | B1 | | 6/2002 | Hines et al. |
| 6,460,743 | B2 | | 10/2002 | Edgerly et al. |
| 6,585,465 | B1 | | 7/2003 | Hammond et al. |
| 6,644,901 | B2 | | 11/2003 | Breckel |
| 6,736,300 | B2 | | 5/2004 | Deakin |
| 6,938,782 | B2 | | 9/2005 | Dean et al. |
| 7,044,701 | B2 | | 5/2006 | Herb |
| 7,070,374 | B2 | | 7/2006 | Womack et al. |
| 7,401,995 | B2 | | 7/2008 | Senakiewich, II et al. |
| 7,497,651 | B2 | | 3/2009 | Klinkman et al. |
| 7,621,487 | B2 | | 11/2009 | Brown et al. |
| 7,757,914 | B2 | | 7/2010 | Book et al. |
| D622,208 | S | | 8/2010 | Sautter et al. |
| 7,874,774 | B2 | * | 1/2011 | Peterson ............... B60P 7/0815 410/104 |
| D635,086 | S | | 3/2011 | Shen |
| 8,100,600 | B2 | | 1/2012 | Blum |
| 8,196,789 | B2 | | 6/2012 | Kraeuter et al. |
| 8,647,009 | B2 | | 2/2014 | Kobayashi |
| D703,605 | S | | 4/2014 | Sautter et al. |
| 8,763,978 | B2 | * | 7/2014 | Newman ................ H02S 20/10 248/500 |
| 8,974,160 | B2 | * | 3/2015 | Bender .................... B60P 7/06 410/104 |
| D731,400 | S | | 6/2015 | Condon et al. |
| 9,187,047 | B2 | | 11/2015 | Sautter et al. |
| 9,365,150 | B2 | * | 6/2016 | Baldsiefen ............ B60P 7/0815 |
| 9,671,060 | B1 | * | 6/2017 | Cifers .................... F16M 13/02 |
| 9,828,073 | B1 | * | 11/2017 | Cifers, III ................ B63B 35/71 |
| 9,863,576 | B1 | * | 1/2018 | Cifers .................... F16M 13/02 |
| 9,879,819 | B1 | * | 1/2018 | Cifers .................... F16M 13/02 |
| D814,388 | S | | 4/2018 | Salsi et al. |
| 10,155,306 | B1 | | 12/2018 | Carnevali |
| 10,429,002 | B2 | | 10/2019 | Carnevali |
| 10,473,150 | B2 | | 11/2019 | Carnevali et al. |
| 10,563,813 | B1 | | 2/2020 | Cifers |
| 2001/0008600 | A1 | | 7/2001 | Fraleigh |
| 2003/0156919 | A1 | | 8/2003 | Schwarz et al. |
| 2004/0131440 | A1 | | 7/2004 | Womack et al. |
| 2004/0165947 | A1 | | 8/2004 | Herb |
| 2005/0269465 | A1 | | 12/2005 | Carnevali |
| 2006/0175595 | A1 | | 8/2006 | Carnevali |
| 2007/0119687 | A1 | | 5/2007 | Foley |
| 2007/0194191 | A1 | | 8/2007 | Persson et al. |
| 2009/0224119 | A1 | | 9/2009 | Heffernan |
| 2009/0279944 | A1 | | 11/2009 | Schmitz et al. |
| 2010/0078454 | A1 | | 4/2010 | Sautter et al. |
| 2010/0150484 | A1 | | 6/2010 | Watson |
| 2010/0192505 | A1 | | 8/2010 | Schaefer et al. |
| 2011/0031370 | A1 | | 2/2011 | Carnevali |
| 2011/0139841 | A1 | | 6/2011 | Sautter et al. |
| 2012/0045276 | A1 | | 2/2012 | Carnevali |
| 2014/0003878 | A1 | * | 1/2014 | Knox ................... B60P 7/0807 410/104 |
| 2015/0030386 | A1 | * | 1/2015 | Carnevali ............... F16B 21/02 403/348 |
| 2016/0186925 | A1 | * | 6/2016 | Bettin .................. F16M 13/022 248/542 |
| 2017/0089058 | A1 | | 3/2017 | Roth |

FOREIGN PATENT DOCUMENTS

| | | |
|---|---|---|
| JP | H1060755 A | 3/1998 |
| JP | 2002180412 A | 6/2002 |

OTHER PUBLICATIONS

YouTube video titled "YakAttack GearTrac Installation", www.youtube.com/watch?v=B8RkSkCQ1rY (Published on Feb. 12, 2012).*

YouTube video titled "Yak Attack camera mounting systems for Kayaks and boats", www.youtube.com/watch?v=-plrnpy0vbNM (Published on Feb. 8, 2012).*

YouTube video titled "YakAttack—GearTrac Overview", www.youtube.com/watch?v=ks3T6cnDqz4 (Published on Nov. 30, 2011).*

YouTube video titled "YakAttack Products 2011, MightyMount T-bolt and threaded RAM ball mounting system for attaching accessories to SlideTrax system", www.youtube.com/watch?v=XdNommHPQjg (Published on Jun. 7, 2011).*

YouTube video titled "Harmony Slide Trax Mounting Plate", www.youtube.com/watch?v=rYhB72SLnXo (Published on Mar. 30, 2011).*

USPTO, Office Action dated Dec. 8, 2015 in related U.S. Appl. No. 13/954,253, filed Jul. 30, 2013.

USPTO, Office Action dated Jun. 10, 2016 in related U.S. Appl. No. 13/954,253, filed Jul. 30, 2013.

USPTO, Office Action dated Jul. 7, 2016 in related U.S. Appl. No. 13/954,253, filed Jul. 30, 2013.

USPTO, Advisory Action dated Dec. 12, 2016 in related U.S. Appl. No. 13/954,253, filed Jul. 30, 2013.

USPTO, Office Action dated Jan. 14, 2016 in related U.S. Appl. No. 13/960,772, filed Aug. 6, 2013.

USPTO, Office Action dated Jul. 12, 2016 in related U.S. Appl. No. 13/960,772, filed Aug. 6, 2013.

USPTO, Office Action dated Sep. 14, 2016 in related U.S. Appl. No. 13/960,772, filed Aug. 6, 2013.

USPTO, Office Action dated Nov. 14, 2016 in related U.S. Appl. No. 13/960,772, filed Aug. 6, 2013.

USPTO, Office Action dated May 17, 2017 in related U.S. Appl. No. 13/960,772, filed Aug. 6, 2013.

USPTO, Advisory Action dated Jul. 5, 2017 in related U.S. Appl. No. 13/960,772, filed Aug. 6, 2013.

USPTO, Office Action dated Mar. 29, 2016 in related U.S. Appl. No. 15/083,295, filed Mar. 29, 2016.

USPTO, Office Action dated Dec. 28, 2016 in related U.S. Appl. No. 15/083,295, filed Mar. 29, 2016.

* cited by examiner

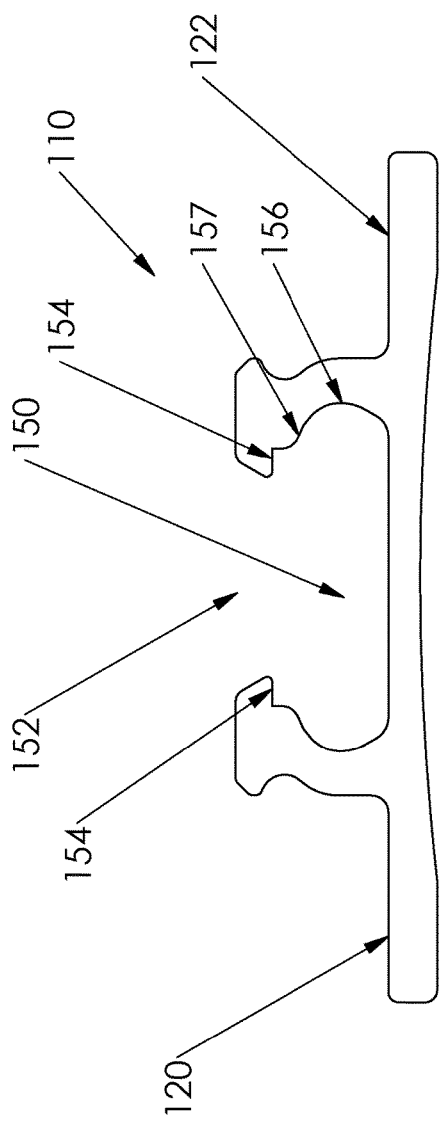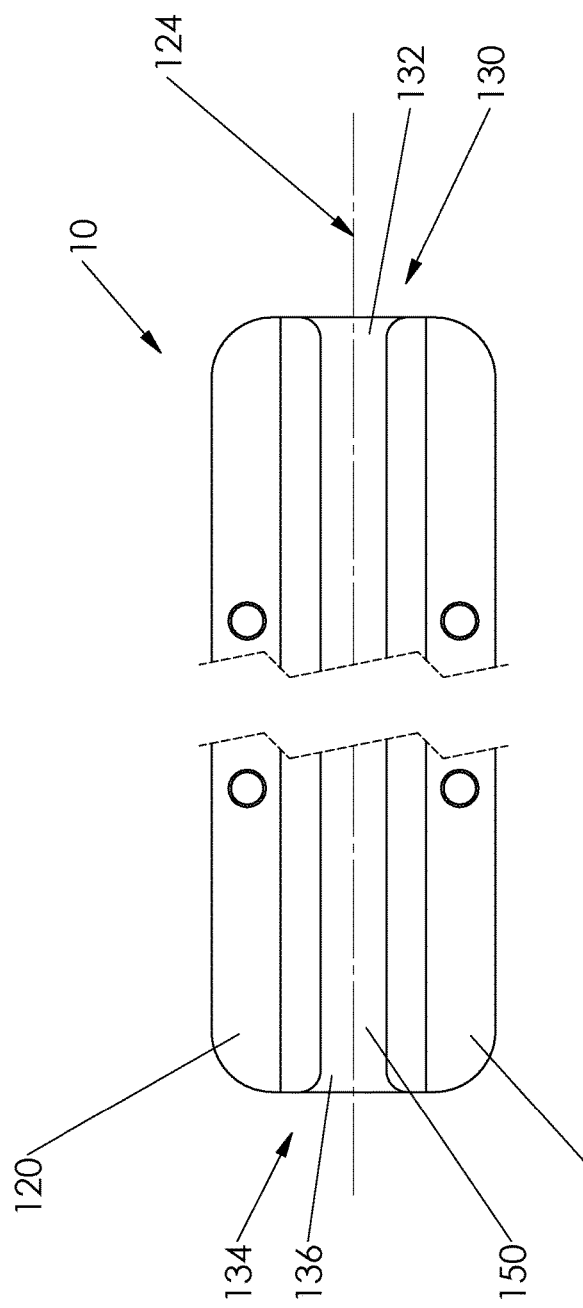

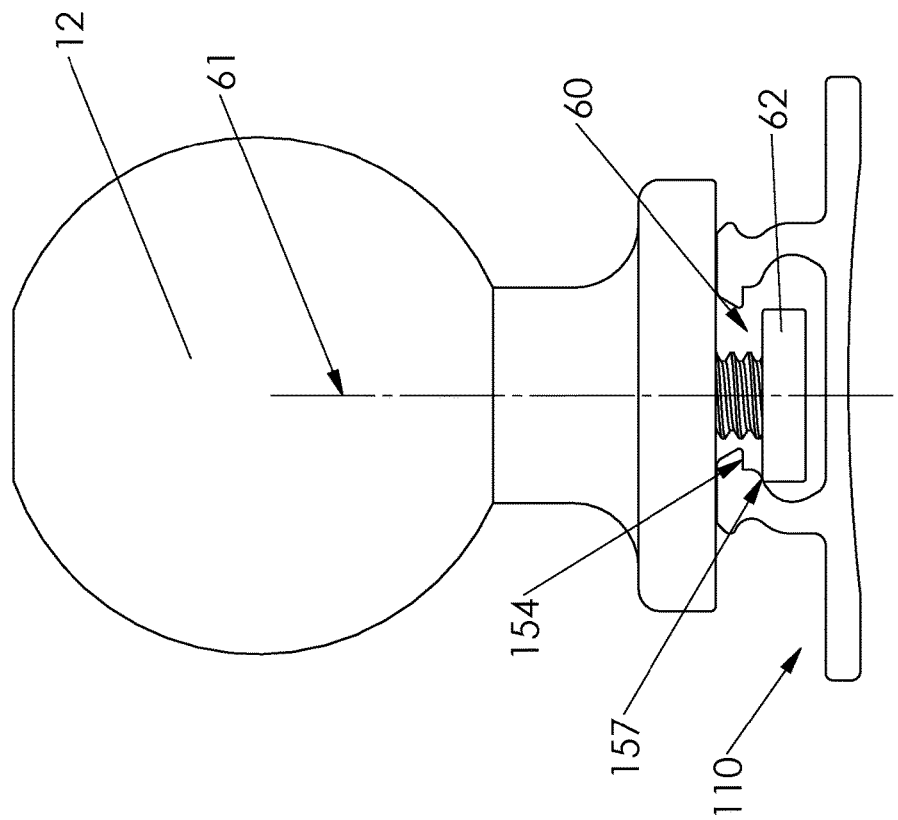
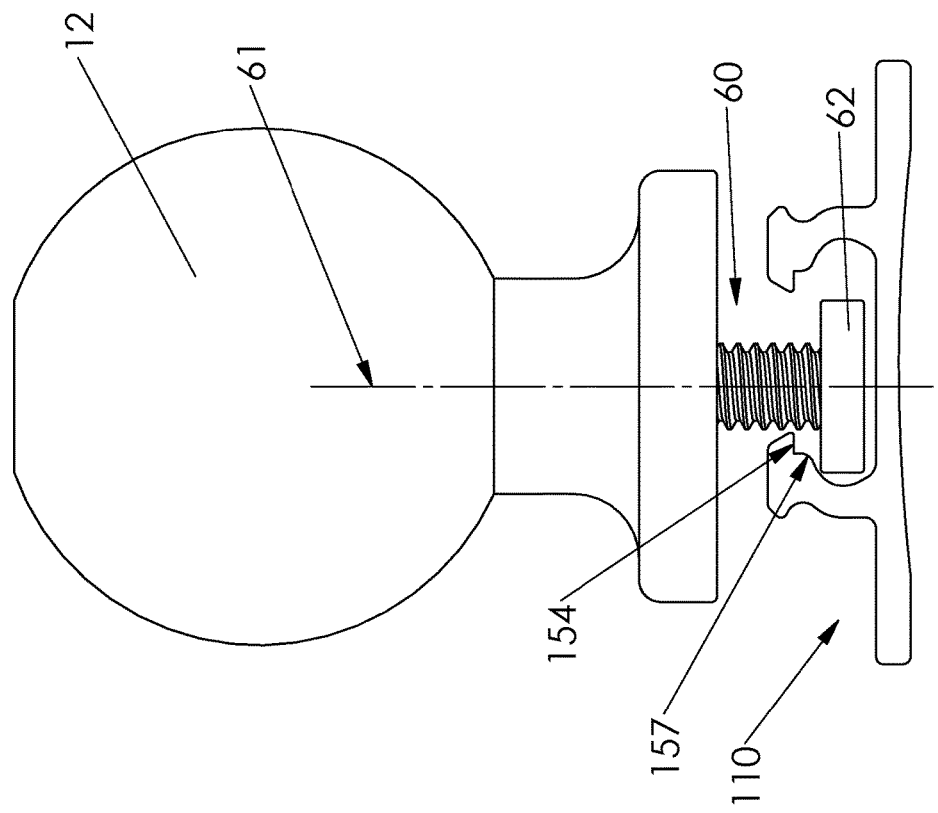

ACCESSORY MOUNTING TRACK

CROSS-REFERENCE TO RELATED APPLICATIONS

This application is a continuation application of pending U.S. patent application Ser. No. 14/822,574, filed Aug. 10, 2015, which is a continuation-in-part application of pending U.S. patent application Ser. No. 13/954,253, filed Jul. 30, 2013, which claims the benefit of U.S. Provisional Application No. 61/677,455, filed Jul. 30, 2012, and U.S. Provisional Application No. 61/680,254 filed Aug. 6, 2012, the disclosures of which are incorporated herein by reference.

BACKGROUND

This invention relates in general to the connection of accessory devices to vehicles or structures, and more particularly, to an accessory mounting track that may be fixed to an environment, providing a secure attachment point for various accessories.

Devices, such as camera mounts, fishing rod holders, personal electronics cradles, marine depth finders, visibility beacons, and various other implements, frequently require quick and easy attachment and removal from structures and vehicles, such as personal watercraft, boats, all-terrain vehicles, airplanes, automobiles, military vehicles and other vehicles and structures utilizing such devices.

In addition to these devices, other items associated with various environments are commonly stored and organized. Many other environments contain a variety of items that need to be stored or organized. Within the scope herein, the term "device" shall refer to any item that may be stored or organized in a given environment, or a bracket designed to support such an item.

In some cases, it may be desirable to alter the deployment configuration of these devices, either by arrangement or position. It may also be desirable to interchangeably attach these devices to fixed mounts and track systems, with the fixed mount providing a rigid single point of attachment and the track system providing a range of deployment positions that may be altered during attachment or while being used in the field.

These devices have long been attached using a variety of methods, including direct and non-removable attachment to the environment, or removable attachment by means of a variety of mounting systems. While track systems have been utilized in some applications, they generally require tracks specifically designed for or fabricated into the vehicle or structure. The designs of these tracks make them unsuitable for surface mounting to environmental surfaces not designed to accept such a track and as a result are unstable and inadequate for such installations.

While there are existing methods of removable attachment for these devices, the scope of compatibility for those methods may be generally limited by the design of the attachment method, which may inhibit aforementioned versatility in deployment of the devices.

There remains a need for an accessory track that provides a secure means of removable attachment, utilizing a small profile designed for surface mounting.

SUMMARY

The present invention relates to an accessory mounting track that provides quick and easy removable attachment and positioning of various devices. The method of attachment of devices to the accessory mounting track may be compatible with the attachment of these devices to other mounting systems, allowing the accessory mounting track to be used interchangeably with those systems.

Various advantages of this invention will become apparent to those skilled in the art from the following detailed description of the preferred embodiment, when read in light of the accompanying drawings.

BRIEF DESCRIPTION OF THE DRAWINGS

FIG. 8 is an elevational view of an alternative accessory mounting track.

FIG. 9 is a top plan view of the alternative accessory mounting track shown in FIG. 8.

FIGS. 10-15 are reduced scale elevational views of the alternative accessory mounting track shown in FIG. 8, progressively demonstrating the insertion of a tee bolt into a slot channel through a slot opening.

DETAILED DESCRIPTION OF THE PREFERRED EMBODIMENT

Figure 1:
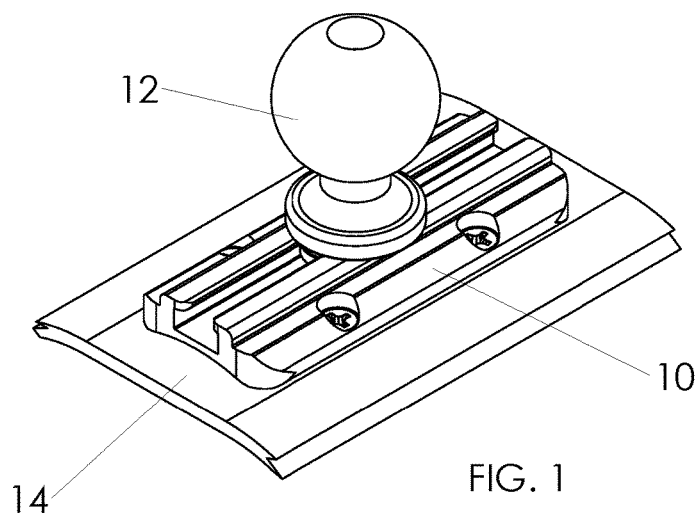
FIG. 1 is a perspective view of an accessory mounting track attached to a supporting environmental surface with a device attached to the accessory mounting track.

Referring now to the drawings, there is illustrated in FIG. 1 an accessory mounting track 10 for removably attaching a device 12 or multiple devices to a supporting environmental surface 14. Exemplary devices are shown in U.S. patent application Ser. No. 13/897,916, filed May 20, 2013, entitled Monopod Turret Support, and U.S. patent application Ser. No. 13/476,441, filed May 21, 2012, published as US Patent Application Publication No. 2012/0293990, entitled Fold-Up Beacon and Associated Post for Vehicles, the disclosures of which are incorporated herein by reference. An additional device is disclosed for example in U.S. Provisional Application No. 61/680,254, entitled Accessory Mounting System.

It shall be observed that the device 12 shown is an example (e.g., a ball for a ball and socket mounting system) of a device that may be attached to the accessory mounting track 10, but a number of devices of many sizes, shapes, and uses, or brackets designed to clamp or support such devices, could be used instead of or in addition to the device 12. The depiction of the device 12 shall not in any way be construed as a limitation as to the size, shape, or type of device that could be attached to the accessory mounting track 10.

The supporting environmental surface may be part of a vehicle, such as a boat or kayak, for example. The supporting environmental surface may alternately be part of a structure, such as a wall in a building or an armrest of a tree stand, for example. It shall be observed that the supporting environmental surface 14 is a graphical representation of an example of such a surface, but that it does not limit in any way the size, shape, or configuration of possible supporting environmental surfaces or the method of attachment to such surfaces.

Figure 2:
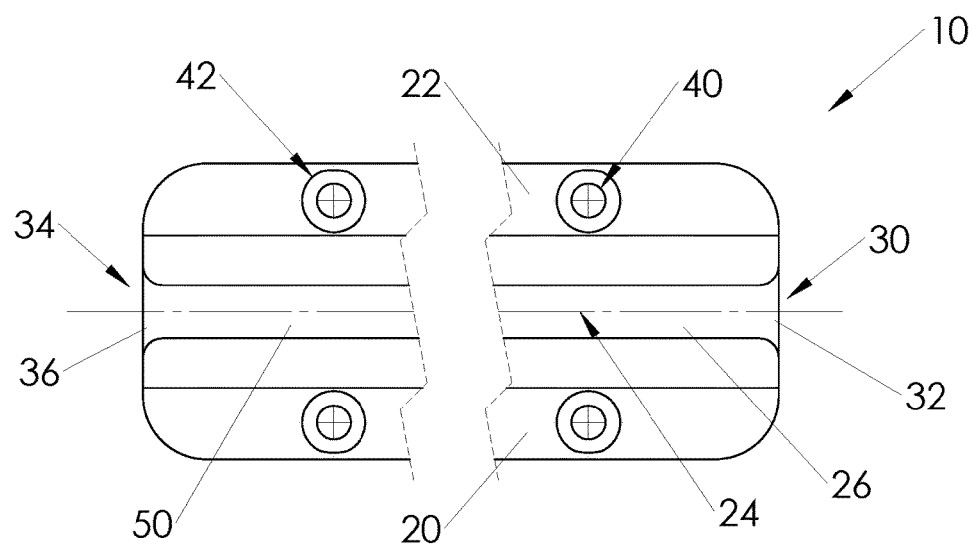
FIG. 2 is a top plan view of an accessory mounting track.
Figure 3:
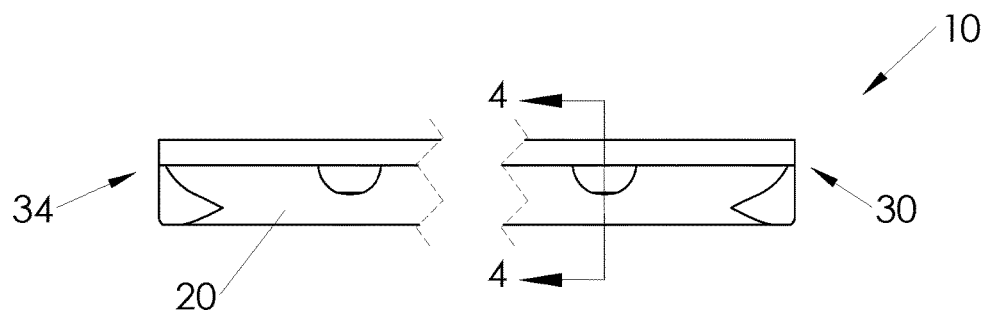
FIG. 3 is an elevational view of the accessory mounting track shown in FIG. 2.

Referring now to FIG. 2, the accessory mounting track 10 may be comprised of a left support flange 20, a right support flange 22, and a central axis 24, which is substantially parallel to a slot channel 50. The accessory mounting track 10 may also comprise a proximal end 30 and a distal end 34 with a proximal slot entry point 32 and a distal slot entry point 36.

It may be mentioned at this point that, for the scope of this entire disclosure, orientation terms, such as "proximal" and "distal" or "left" and "right", refer to their subject matter as semantic conveniences only and not as a necessary condition of the accessory mounting track 10, as the accessory mounting track 10 may obviously be utilized in any desired position or orientation.

The accessory mounting track 10 may also comprise attachment holes 40 linearly disposed parallel to the central axis 24 near the outermost edges of the left support flange 20 and the right support flange 22. The attachment holes 40 may have a countersink feature 42 or a counter bore feature (not shown).

Figure 4:
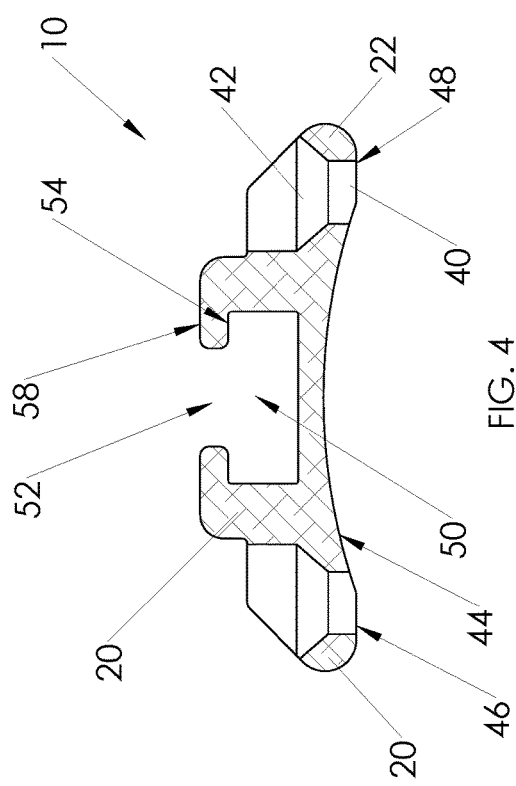
FIG. 4 is an enlarged cross-sectional view taken along the line 4-4 in FIG. 3.

Referring now to FIG. 4, the accessory mounting track 10 may have a concave recess 44, which may terminate at a left interface flat 46 and a right interface flat 48 on the bottom of the left support flange 20 and right support flange 22, respectively. The left interface flat 46 and right interface flat 48 may be approximately aligned with the attachment holes 40 in the corresponding left support flange 20 and right support flange 22. This arrangement may maximize the opportunity for the left interface flat 46 and the right interface flat 48 to have firm contact with the supporting environmental surface 14. Because of the relatively wide spacing between the left interface flat 46 and right interface flat 48, high lateral stability may be achieved. The concave recess 46 may minimize the opportunity for a curved or irregular supporting environmental surface 14 to make contact in regions between the left interface flat 46 and right interface flat 48.

The accessory mounting track 10 may also comprise a slot channel 50, which may have a slot opening 52, which may be bounded on each side by a containment ledge 54.

Figure 5:
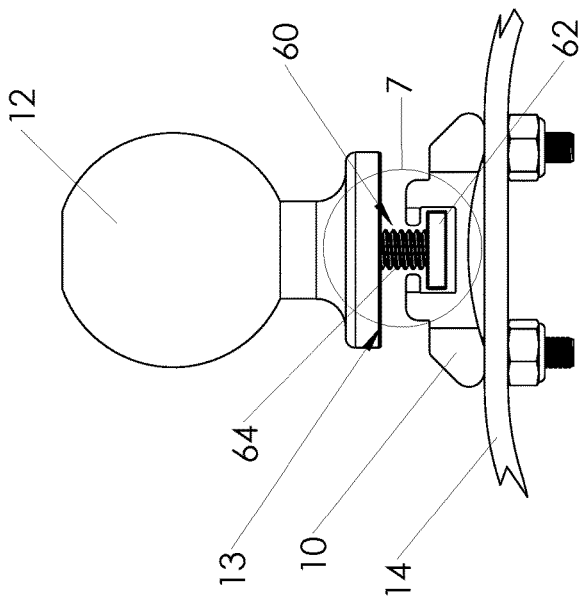
FIG. 5 is a partially exploded end view of the components shown in FIG. 1.
Figure 7:
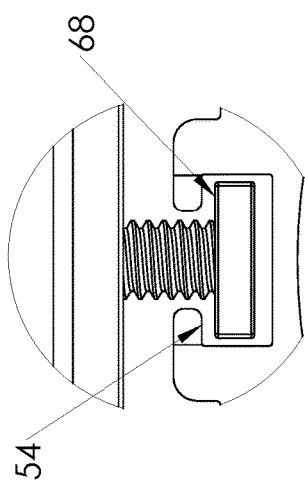
FIG. 7 is an enlarged view of the detail referenced as 7 in FIG. 5.

Referring now to FIG. 5, a device 12 is shown being attached to the accessory mounting track 10. There is a tee-bolt 60 comprising a head 62 and a stud 64 threaded into the device 12. The tee-bolt 60 is in the slot channel 50, oriented so that the stud 64 is in the slot opening 52. In the state shown in FIG. 5, the device 12 may be positioned along the central axis 24 (shown in FIG. 2), with the slot channel 50 containing the tee-bolt 60 within it, but not preventing movement along the central axis 24.

Figure 6:
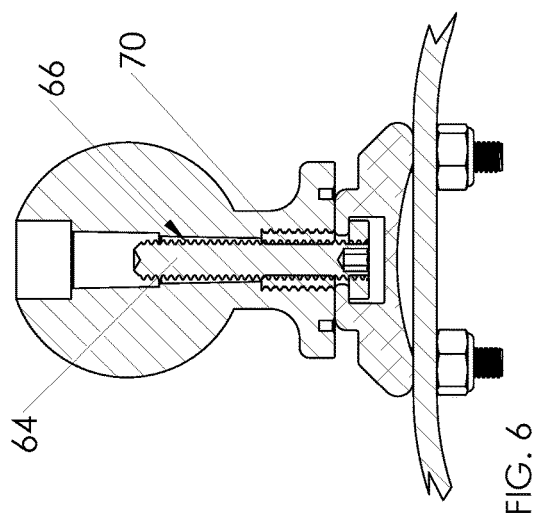
FIG. 6 is similar to FIG. 5 except it is not exploded and is shown at a section cut through the center of the device.

Looking now at FIG. 6, the device 12 is shown after being fully installed on the accessory mounting track 10. The device 12 has female threads 70, which are threaded onto the stud 64 of the tee-bolt 60.

It should be appreciated that by rotating the device 12, the threads 66 of the stud 64 interact with the female threads 70, which may urge the device 12 towards or away from the head 62 of the tee-bolt 60, depending on the direction of rotation. When appropriately rotated, the device 12 is urged towards the head 62 of the tee-bolt 60 until the mounting surface 13 of the device 12 makes contact with the track upper surface 58 (shown in FIG. 4) of the accessory mounting track 10 and the head upper surface 68 makes contact with the containment ledge 54. When the device is turned further, friction is increased between these surfaces, which effectively locks the device 12 in position. By rotating the device 12 in the opposite direction, the friction is eliminated and the device 12 may once again be positioned along the central axis 24, or removed from the track through the slot opening or by sliding it out of either end of the accessory mounting track 10.

The accessory mounting track 10 may comprise an extruded profile with attachment holes 40. The length of the track 10 may vary as may the number of attachment holes 40. The attachment holes 40 may be disposed linearly near the outer edges of the track 10 or linearly, approximately centered and along the longest axis of the track 10. The attachment holes 40 may be of counter bore or countersink type, or may be simple thru holes. The recess 44 may be concave, angular, or another shape, allowing clearance for attaching to rounded or irregular surfaces and maximizing stability by enabling the supporting environment to make contact with the track 10 along the edges. The region near the outer edges of the underside of the track 10 may be flat and approximately aligned with the rows of attachment holes 40 to maximize lateral stability.

The track 10 composition may be of a lightweight material, such as aluminum or plastic, or a composite comprising two or more such materials. The surface of the track 10 may be treated for harsh environmental exposure, such as UV radiation and saltwater. The upper surface of the track 10 may be textured with any suitable texture to improve the gripping characteristics of that surface, which may increase resistance to accessories mounted to that surface from slipping either by rotation or linearly along the axis of the track 10. This texture may be the result of geometry in the track shape, such as ridges or grooves in the surface. Alternately or in addition to this geometry, the texture may be the result of etching, application of plastic or rubberized coating, or other surface treatments.

Attachment of the track 10 to the support surface may be achieved by putting screws or other suitable fasteners through one or more of the attachment holes 40 and into the surface on which the track 10 is to be mounted. In some configurations, the track 10 may be attached to an adapter bracket, such as a rail clamp, for attachment to the environment, or molded or integrated into the support surface.

The track profile may contain an internal C-shaped slot or other suitable shape to receive a tee-bolt, sliding nut, or other connecting feature internally with which to attach accessory devices.

The tee-bolt 60 may be attached to the device 12 by screwing the threaded stud 64 of the tee-bolt 60 into the device 12, leaving the head 62 of the tee-bolt 60 extended some distance from the device 12.

Attachment of the device 12 to the track 10 may be achieved by inserting the head 62 of the tee-bolt 60 into a slot 50, from either the proximal slot entry point 32 or the distal slot entry point 36. The C-shape of the slot 50 may captivate the head 62 of the tee-bolt 10, allowing movement only along the long axis of the track 10. Once positioned, the device 12 may be immovably tightened to the track 10 by rotating the device 12. The interaction between the threads in the device 12 and those on the stud 64 urges the head 62 of the tee-bolt 60 towards the device 12, thus causing the head 62 of the tee-bolt 60 to make contact with the inside of the slot 50 and causing the device 12 to make contact with the upper surface of the track 10 opposite of the slot 50. Further rotation of the device 12 creates pressure on these areas of contact, the resulting friction of which, with reasonable tightening force, is adequate to inhibit rotation of the device 12 in either the tightening or the loosening direction or from slipping linearly along the track 10. As previously mentioned, texture on the mounting surface of the track 10 may increase this friction.

It should be understood that although a tee-bolt attachment method is depicted in these drawings, other methods of secure and removable attachment of devices to the accessory mounting track 10 may also be used. For example, in an alternate configuration, a slot nut and stud configuration (not shown) may be used instead of a tee-bolt. In this configuration, the slot nut is inserted into the slot 50 instead of the head of the tee-bolt. The slot nut is not permanently attached to the stud as it is in the tee-bolt configuration, but instead has female threads which interact with a stud, resulting in a tightening effect that is to that of the tee-bolt configuration.

In applications in which excessive rotational forces may be applied to the device 12, an external locking mechanism (not shown) may be used to prevent the device 12 from rotating in the loosening direction. Also, mechanical features (e.g. grooves, serration, or teeth) may be incorporated into some surface on or surfaces on the track that cooperate with corresponding features on the device 12, or that encourage increased friction between the track and the device.

On the sides of the track there may be grooves in a dovetail, radial, or other shape (not shown), which may allow attachment of devices by externally clamping the track 12, in cooperation with or independent of the C-shaped slot 50 described above. In this application, the device 12 may have features that cooperate with the grooves so that when it is tightened, the features in the device 12 will mechanically interlock with the grooves.

The ends of the track 10 may be contoured to remove edges that may cause injury or snags or may be angled in such a way that interference of gear, persons or other external items is minimized.

Now, with reference to FIG. 8, there is illustrated an alternative accessory mounting track 110, which may comprise features that enable the insertion of a tee bolt 60 (shown in FIG. 10) through a slot opening 152 into a slot 150. This insertion of a tee bolt 60 through a slot opening 152 may be referred to as "top loading", and differs from the insertion of a tee bolt 60 into the previously described accessory mounting track 10, which may require insertion of the tee bolt 60 at either the proximal slot entry point 32 or the distal slot entry point 36 of the accessory mounting track 10, as described above.

Referring now to FIG. 9, the alternative accessory mounting track 110 may comprise a left support flange 120, a right support flange 122, and a central axis 124, which is substantially parallel to the slot 150. The alternative accessory mounting track 110 may also comprise a proximal end 130 and a distal end 134 with a proximal slot entry point 132 and a distal slot entry point 136.

Referring back to FIG. 8, the slot opening 152 may be bounded on each side by a containment ledge 154. There may also be present a clearance pocket 156 on one or more sides of the slot channel 150 and a slot guide 157 may exist between the clearance pocket 156 and containment ledge 154.

Considering now the top loading function of the alternative accessory mounting track 110, we look now to FIGS. 10-15, which may illustrate, in progressive fashion, the connection of a device 12 to the alternative accessory mounting track 110, by inserting the tee bolt 60 through the slot opening 152 into the slot 150.

Figure 10:
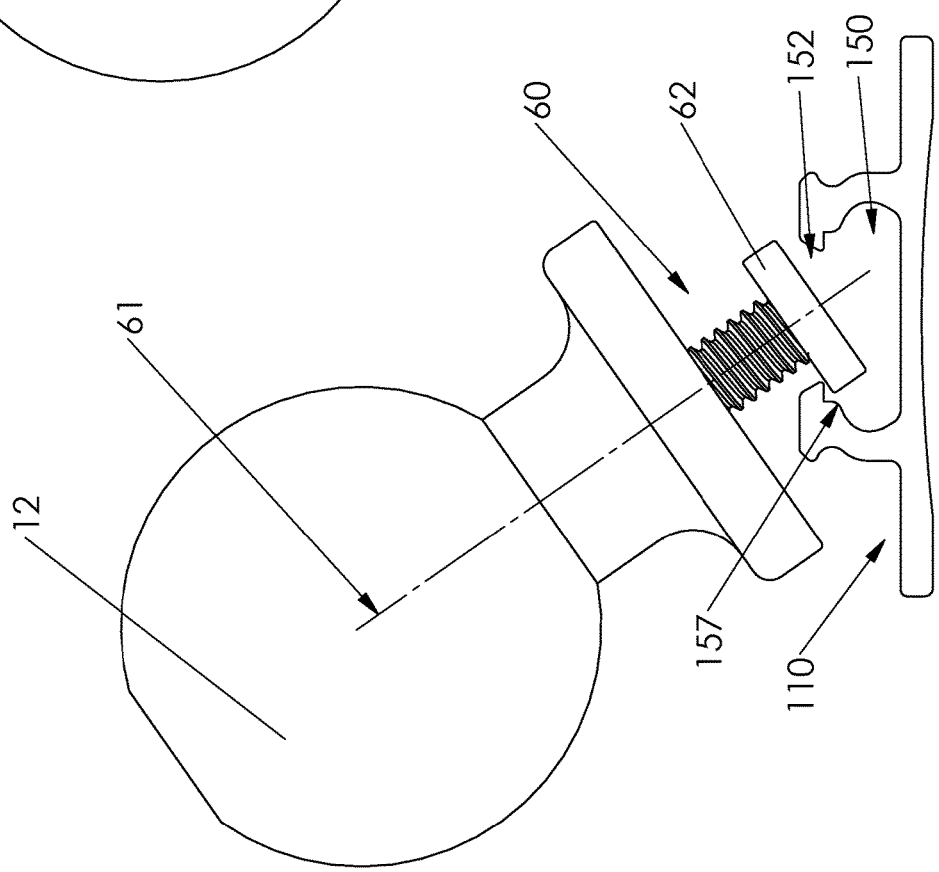
Figure 15:
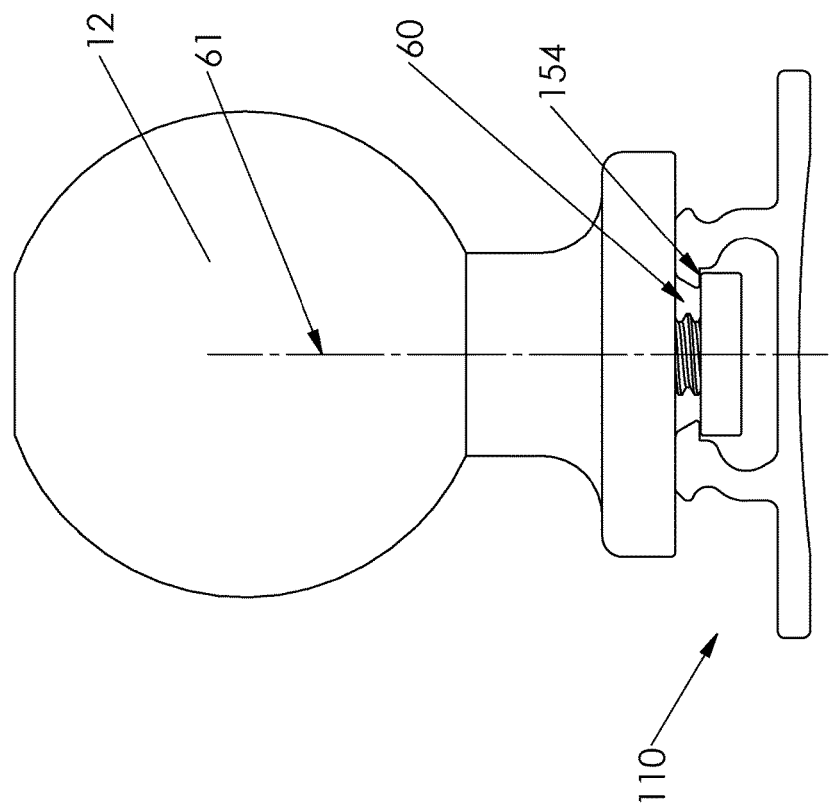
Figure 14:
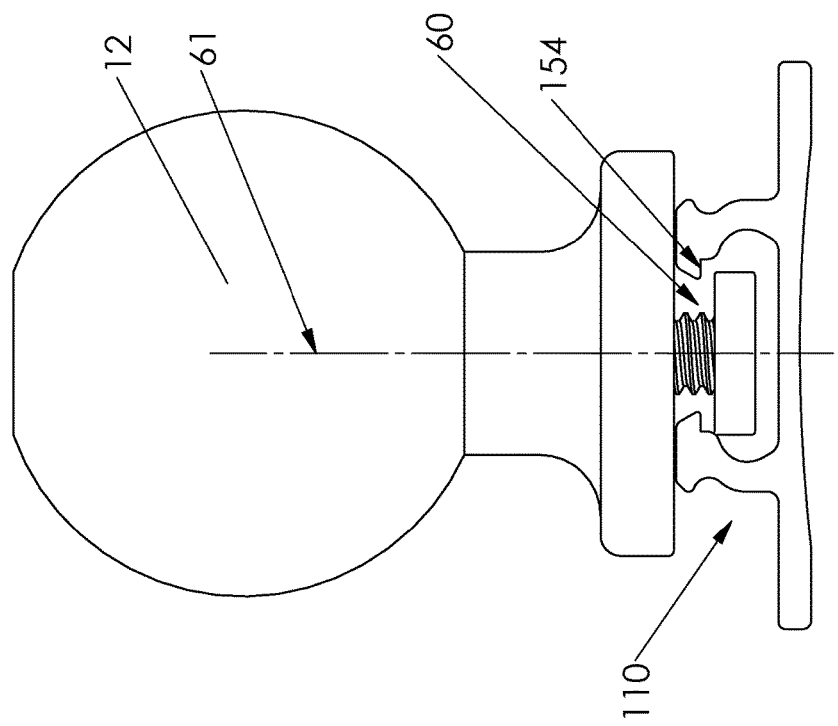

Starting with FIG. 10, we see that the tee bolt 60 is introduced to the alternative accessory mounting track 110 in such a manner that the axis 61 of the tee bolt 60 is angled with respect to the alternative accessory mounting track 110. This arrangement may enable the insertion of the head 62 of the tee bolt 60 through the slot opening 152 and into the slot 150.

Figure 11:
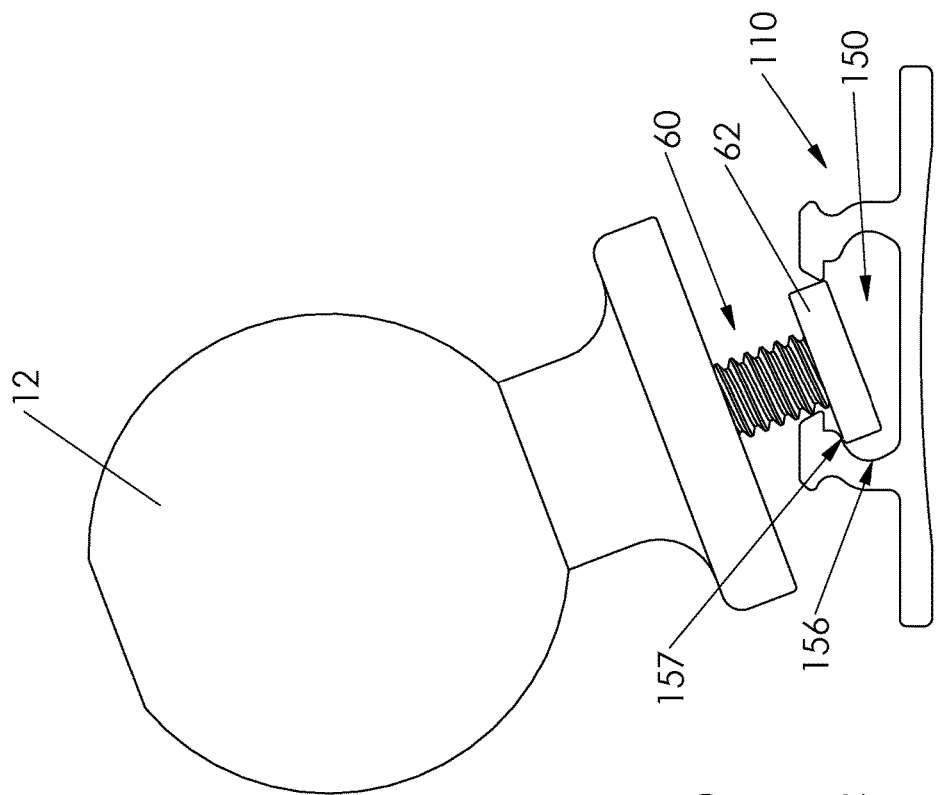

In FIG. 11 we can see the head 62 of the tee bolt 60 beginning to enter the clearance pocket 156 of the slot 150. It may be evident that when the head 62 is substantially inserted into the clearance pocket 156 of the slot 150, that the head 62 may fully clear the slot opening 152 so that the head 62 may attain a position that is fully contained in the slot 150 as shown in FIG. 12.

Looking at FIGS. 12-15, it can be seen that, as the tee bolt 60 is urged along its axis 61, as it may be when attaching the device 12, as described above, the head 62 of the tee bolt 60 may contact the containment ledge 154 on both sides, urged into this position by the slot guide 157. This prevents the tee bolt 60 from rotating about its axis 61, and enables secure connection of the device 12 to the alternative accessory mounting track 110 without requiring access to the proximal slot entry point 132 or distal slot entry point 136 of the accessory mounting track 110.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An accessory mounting track for removably attaching and positioning one or more accessory devices to a supporting surface, the accessory mounting track comprising:
    a slot channel within the accessory mounting track for supporting at least a portion of a fastener in the slot channel for selective movement of the portion of the fastener in the slot channel,
    a slot opening in an upper surface of the accessory mounting track, the slot opening being sized and configured to enable insertion of the portion of the fastener therethrough, the slot opening bounded on each side by a containment ledge, the slot opening and the containment ledge at least partially defining the slot channel,
    a clearance pocket on at least one side of the slot channel, the clearance pocket being sized and configured such that, when the portion of the fastener is substantially inserted into the clearance pocket, the portion of the fastener fully clears the slot opening so that the portion of the fastener attains a position that is contained in the slot channel, and
    a slot guide between the clearance pocket and one of the containment ledges, the slot guide being sized and configured such that, as the fastener is urged along an axis, the portion of the fastener is guided into contact with the containment ledge on each side of the slot channel to enable a secure connection of a device to the accessory mounting track,
    a bottom having a first interface surface and a second interface surface spaced apart from the first interface surface for engaging the supporting surface, and
    a recess on the bottom of the accessory mounting track between the first interface surface and the second interface surface to minimize the risks of a curved or irregular portion of the supporting surface making contact with the accessory mounting track in a region between the first interface surface and the second interface surface.

2. The accessory mounting track of claim 1, further comprising:

a first support flange, a second support flange laterally spaced apart from the first support flange by the recess on the bottom of the accessory mounting track, the first and second support flanges each having a bottom at least partially defining the bottom of the accessory mounting track.

3. The accessory mounting track of claim 2, further comprising:

one or more attachment holes linearly disposed parallel to a central axis of the accessory mounting track for attaching the accessory mounting track to the supporting surface by putting a track fastener through one or more of the attachment holes and securing the track fastener to the supporting surface, wherein the one or more attachment holes are linearly disposed near outermost edges of the first support flange and the second support flange.

4. The accessory mounting track of claim 3, wherein the one or more attachment holes have a countersink feature or a counter bore feature.

5. The accessory mounting track of claim 4, wherein the recess terminates at the first interface surface and the second interface surface on the bottom of the first support flange and the second support flange, respectively.

6. The accessory mounting track of claim 5, wherein the recess is concave or angular in shape.

7. The accessory mounting track of claim 3, wherein the one or more attachment holes have a countersink feature or a counter bore feature.

8. The accessory mounting track of claim 1, wherein the recess is concave or angular in shape.

9. A marine vessel comprising:
a supporting surface,
a device, and
an accessory mounting track for removably attaching and positioning the device to the supporting surface, the accessory mounting track comprising:
an elongated slot channel within the accessory mounting track and disposed lengthwise of the accessory mounting track for supporting at least a portion of a fastener in the slot channel for selective movement of the portion of the fastener in the slot channel,
a slot opening in an upper surface of the accessory mounting track, the slot opening being sized and configured to enable insertion of the portion of the fastener therethrough, the slot opening bounded on each side by a containment ledge within the slot channel, the slot opening and the containment ledge at least partially defining the slot channel, and
a clearance pocket on at least one side of the slot channel, the clearance pocket being sized and configured such that, when the portion of the fastener is substantially inserted into the clearance pocket, the portion of the fastener fully clears the slot opening so that the portion of the fastener attains a position that is contained in the slot channel, and
a slot guide between the clearance pocket and one of the containment ledges, the slot guide being sized and configured to guide the fastener from the clearance pocket into contact with the containment ledge on each side of the slot channel to enable secure connection of a device to the accessory mounting track.

10. The marine vessel of claim 9, wherein the supporting surface is a surface of a kayak and the accessory mounting track further comprises:

a bottom having a first interface surface and a second interface surface spaced apart from the first interface surface for engaging the supporting surface, and a recess on the bottom of the accessory mounting track between the first interface surface and the second interface surface to minimize the risks of a curved or irregular portion of the supporting surface making contact with the accessory mounting track in regions between the first interface flat and the second interface flat.

11. The marine vessel of claim 10, wherein the recess is concave or angular in shape.

12. A method of removably attaching and positioning one or more accessory devices to a supporting surface comprising the steps of:

a) providing a track with a mounting surface and a bottom, a slot channel within the track, a slot opening bounded on each side by a containment ledge, a clearance pocket on at least one side of the slot channel, and a slot guide between the clearance pocket and the slot opening, b) mounting the track to the supporting surface, c) providing a fastener having a portion on one end and a threaded stud on another end, d) screwing the threaded end of the fastener into an accessory device, leaving the portion of the fastener extended some distance from the accessory device, e) inserting the portion of the fastener into the slot opening and further into the clearance pocket, f) rotating the fastener in the slot channel to guide the portion of the fastener along the slot guide towards the slot opening to capture the portion of the fastener in the slot channel, allowing movement only along a long central axis of the track, g) tightening the device to the track by rotating the device so that interaction between threads in the device and threads on the fastener urges the portion of the fastener towards the device, thus causing the device to make contact with the mounting surface on an opposite side of the slot, and h) further rotating the device to increase pressure on the slot channel and the mounting surface, resulting in friction that, with reasonable tightening force, is adequate to inhibit rotation of the device in either the tightening or the loosening direction or from slipping linearly along the track.

13. The method of claim 12, wherein the fastener is in the slot channel, oriented so that the threaded stud is in the slot opening.

14. The method of claim 12, wherein the device may be positioned along the long central axis, with the slot channel containing the fastener therein, but not preventing movement of the fastener along the long central axis.

15. The method of claim 12, wherein the mounting surface has a texture to increase the friction.

16. A marine vessel comprising:
a supporting surface,
a device, and
an accessory mounting track for removably attaching and positioning the device to the supporting surface, the accessory mounting track comprising:
an elongated slot channel within the accessory mounting track and disposed lengthwise of the accessory mounting track for supporting at least a portion of a fastener in the slot channel for selective movement of the portion of the fastener in the slot channel, a slot opening in an upper surface of the accessory mounting track, the slot opening being sized and configured to enable insertion of the portion of the fastener therethrough, the slot opening bounded on each side by a containment ledge, the slot opening and the containment ledge at least partially defining the slot channel, a clearance pocket on at least one side of the slot channel, the clearance pocket being sized and configured such that, when the portion of the fastener is substantially inserted into the clearance pocket, the portion of the fastener fully clears the slot opening so that the portion of the fastener attains a position that is contained in the slot channel, and a slot guide between the clearance pocket and one of the containment ledges, the slot guide being sized and configured such that, as the fastener is urged along an axis of the fastener, the enlarged portion of the fastener is guided into contact with the containment ledge on each side of the slot channel to enable secure connection of a device to the accessory mounting track.

\* \* \* \* \*